(12) United States Patent
Johnson et al.

(10) Patent No.: US 10,100,200 B2
(45) Date of Patent: Oct. 16, 2018

(54) USE OF FEEDSTOCK IN CARBON BLACK PLASMA PROCESS

(71) Applicant: MONOLITH MATERIALS, INC., Redwood City, CA (US)

(72) Inventors: Peter L. Johnson, Mountain View, CA (US); Robert J. Hanson, San Carlos, CA (US); Roscoe W. Taylor, San Mateo, CA (US); James Premkumar, Calgary (CA)

(73) Assignee: MONOLITH MATERIALS, INC., Redwood City, CA (US)

( * ) Notice: Subject to any disclaimer, the term of this patent is extended or adjusted under 35 U.S.C. 154(b) by 0 days.

(21) Appl. No.: 14/591,541

(22) Filed: Jan. 7, 2015

(65) Prior Publication Data

US 2015/0210857 A1    Jul. 30, 2015

Related U.S. Application Data

(60) Provisional application No. 61/933,488, filed on Jan. 30, 2014.

(51) Int. Cl.
*C09C 1/48*  (2006.01)
*C09C 1/58*  (2006.01)

(52) U.S. Cl.
CPC ............... *C09C 1/485* (2013.01); *C09C 1/48* (2013.01); *C01P 2006/19* (2013.01); *C09C 1/58* (2013.01)

(58) Field of Classification Search
CPC .................................. C09C 1/48; C09C 1/485
See application file for complete search history.

(56) References Cited

U.S. PATENT DOCUMENTS

| | | |
|---|---|---|
| 1,339,225 A | 5/1920 | Rose |
| 1,536,612 A | 5/1925 | Lewis |
| 1,597,277 A | 8/1926 | Jakowsky |
| 2,062,358 A | 9/1932 | Frolich |
| 2,002,003 A | 5/1935 | Eisenhut et al. |
| 2,393,106 A | 1/1946 | Johnson et al. |
| 2,557,143 A | 6/1951 | Royster |
| 2,572,851 A | 10/1951 | Jordan et al. |
| 2,616,842 A | 11/1952 | Sheer et al. |
| 2,785,964 A | 3/1957 | Pollock |
| 2,850,403 A | 9/1958 | Day |
| 2,951,143 A | 8/1960 | Anderson et al. |
| 3,009,783 A | 11/1961 | Sheer et al. |
| 3,073,769 A | 1/1963 | Doukas |
| 3,288,696 A | 11/1966 | Orbach |
| 3,307,923 A | 3/1967 | Ruble |
| 3,308,164 A | 3/1967 | Shepard |
| 3,309,780 A | 3/1967 | Goins |
| 3,331,664 A | 7/1967 | Jordan |
| 3,344,051 A | 9/1967 | Latham, Jr. |
| 3,408,164 A | 10/1968 | Johnson |
| 3,409,403 A | 11/1968 | Bjornson et al. |
| 3,420,632 A | 1/1969 | Ryan |
| 3,431,074 A | 3/1969 | Jordan |
| 3,619,140 A | 11/1971 | Morgan et al. |
| 3,637,974 A | 1/1972 | Tajbl et al. |
| 3,673,375 A | 6/1972 | Camacho |
| 3,725,103 A | 4/1973 | Jordan et al. |
| 3,922,335 A | 11/1975 | Jordan et al. |
| 3,981,654 A | 9/1976 | Rood et al. |
| 3,981,659 A | 9/1976 | Myers |
| 3,984,743 A | 10/1976 | Horie |
| 4,028,072 A | 6/1977 | Braun et al. |
| 4,035,336 A | 7/1977 | Jordan et al. |
| 4,057,396 A | 11/1977 | Matovich |
| 4,075,160 A | 2/1978 | Mills et al. |
| 4,101,639 A | 7/1978 | Surovikin et al. |
| 4,199,545 A | 4/1980 | Matovich |
| 4,282,199 A | 8/1981 | Lamond et al. |
| 4,289,949 A | 9/1981 | Raaness et al. |
| 4,317,001 A | 2/1982 | Silver et al. |
| 4,372,937 A | 2/1983 | Johnson |
| 4,404,178 A | 9/1983 | Johnson et al. |
| 4,452,771 A | 6/1984 | Hunt |
| 4,431,624 A | 8/1984 | Casperson |
| 4,472,172 A | 9/1984 | Sheer et al. |
| 4,553,981 A | 11/1985 | Fuderer |

(Continued)

FOREIGN PATENT DOCUMENTS

| | | | |
|---|---|---|---|
| AU | 28970/71 A | | 5/1971 |
| CA | 830378 A | | 12/1969 |

(Continued)

OTHER PUBLICATIONS

ISR and Written Opinion from PCT/US2015/013482, dated Jun. 17, 2015.
ISR and Written Opinion from PCT/US2015/013505, dated May 11, 2015.
Isr and Written Opinion from PCT/US2015/013794, dated Jun. 19, 2015.
Donnet, Basal and Wang, "Carbon Black", New York: Marcel Dekker, 1993 pp. 46, 47 and 54.
Boehm, HP, "Some Aspects of Surface Chemistry of Carbon Blacks and Other Carbons", Carbon 1994, p. 759.
"The Science and Technology of Rubber" (Mark, Erman, and Roland, Fourth Edition, Academic Press, 2013).
"Carbon Black Elastomer Interaction" Rubber Chemistry and Technology, 1991, pp. 19-39.
"The Impact of a Fullerene-Like Concept in Carbon Black Science", Carbon, 2002, pp. 157-162.

(Continued)

*Primary Examiner* — Stuart Hendrickson
(74) *Attorney, Agent, or Firm* — Greenblum & Bernstein, P.L.C.

(57) ABSTRACT

A method of making carbon black. A method of making carbon black is described including combusting feedstock with plasma in an apparatus having a series of unit operations with individual capacities. The individual capacities of the unit operations are substantially balanced by replacing at least part of the feedstock with a feedstock having a molecular weight heavier than methane. This results, among other things, in increased utilization of the individual capacities of the unit operations and increased overall throughput.

34 Claims, 1 Drawing Sheet

(56) References Cited

U.S. PATENT DOCUMENTS

| | | | |
|---|---|---|---|
| 4,601,887 A | 7/1986 | Dorn et al. |
| 4,678,888 A | 7/1987 | Camacho et al. |
| 4,689,199 A | 8/1987 | Eckert et al. |
| 4,765,964 A | 8/1988 | Gravley et al. |
| 4,787,320 A | 11/1988 | Raaness et al. |
| 4,864,096 A | 9/1989 | Wolf et al. |
| 4,977,305 A | 12/1990 | Severance, Jr. |
| 5,039,312 A | 8/1991 | Hollis, Jr. et al. |
| 5,045,667 A | 9/1991 | Iceland et al. |
| 5,046,145 A | 9/1991 | Drouet |
| 5,105,123 A | 4/1992 | Ballou |
| 5,147,998 A | 9/1992 | Tsantrizos et al. |
| 5,206,880 A | 4/1993 | Olsson |
| 5,399,957 A | 3/1995 | Vierboom et al. |
| 5,481,080 A | 1/1996 | Lynum et al. |
| 5,486,674 A | 1/1996 | Lynum et al. |
| 5,500,501 A | 3/1996 | Lynum et al. |
| 5,527,518 A | 6/1996 | Lynum et al. |
| 5,593,644 A | 1/1997 | Norman et al. |
| 5,604,424 A | 2/1997 | Shuttleworth |
| 5,611,947 A | 3/1997 | Vavruska |
| 5,717,293 A | 2/1998 | Sellers |
| 5,725,616 A | 3/1998 | Lynum et al. |
| 5,935,293 A | 8/1999 | Detering et al. |
| 5,951,960 A | 9/1999 | Lynum et al. |
| 5,989,512 A | 11/1999 | Lynum et al. |
| 5,997,837 A | 12/1999 | Lynum et al. |
| 6,068,827 A | 5/2000 | Lynum et al. |
| 6,099,696 A | 8/2000 | Schwob et al. |
| 6,188,187 B1 | 2/2001 | Harlan |
| 6,197,274 B1 | 3/2001 | Mahmud et al. |
| 6,358,375 B1 | 3/2002 | Schwob |
| 6,380,507 B1 | 4/2002 | Childs |
| 6,395,197 B1 | 5/2002 | Detering et al. |
| 6,444,727 B1 | 9/2002 | Yamada et al. |
| 6,602,920 B2 | 8/2003 | Hall et al. |
| 6,703,580 B2 | 3/2004 | Brunet et al. |
| 6,773,689 B1 | 8/2004 | Lynum et al. |
| 7,167,240 B2 | 1/2007 | Stagg |
| 7,452,514 B2 | 11/2008 | Fabry et al. |
| 7,462,343 B2 | 12/2008 | Lynum et al. |
| 7,563,525 B2 | 7/2009 | Ennis |
| 7,655,209 B2 | 2/2010 | Rumpf et al. |
| 8,147,765 B2 | 4/2012 | Muradov et al. |
| 8,221,689 B2 | 7/2012 | Boutot et al. |
| 8,257,452 B2 | 9/2012 | Menzel |
| 8,277,739 B2 | 10/2012 | Monsen et al. |
| 8,323,793 B2 * | 12/2012 | Hamby .................. C09C 1/48 |
| | | 423/449.1 |
| 8,443,741 B2 | 5/2013 | Chapman et al. |
| 8,471,170 B2 | 6/2013 | Li et al. |
| 8,486,364 B2 | 7/2013 | Vanier et al. |
| 8,501,148 B2 | 8/2013 | Belmont et al. |
| 8,581,147 B2 | 11/2013 | Kooken et al. |
| 8,771,386 B2 | 7/2014 | Licht et al. |
| 8,784,617 B2 | 7/2014 | Novoselov et al. |
| 8,850,826 B2 | 10/2014 | Ennis |
| 8,871,173 B2 | 10/2014 | Nester et al. |
| 8,911,596 B2 | 12/2014 | Vancina |
| 9,445,488 B2 | 9/2016 | Foret |
| 9,574,086 B2 | 2/2017 | Johnson et al. |
| 2001/0029888 A1 | 10/2001 | Sindarrajan et al. |
| 2001/0039797 A1 | 11/2001 | Cheng |
| 2002/0000085 A1 | 1/2002 | Hall et al. |
| 2002/0050323 A1 | 5/2002 | Moisan et al. |
| 2002/0157559 A1 | 10/2002 | Brunet et al. |
| 2003/0152184 A1 | 8/2003 | Shehane et al. |
| 2004/0047779 A1 | 3/2004 | Denison |
| 2004/0071626 A1 | 4/2004 | Smith et al. |
| 2004/0081862 A1 | 4/2004 | Herman |
| 2004/0148860 A1 | 8/2004 | Fletcher |
| 2004/0168904 A1 | 9/2004 | Anazawa et al. |
| 2004/0211760 A1 | 10/2004 | Delzenne et al. |
| 2004/0247509 A1 | 12/2004 | Newby |
| 2005/0063892 A1 | 3/2005 | Tandon et al. |
| 2005/0230240 A1 | 10/2005 | Dubrovsky et al. |
| 2006/0034748 A1 | 2/2006 | Lewis et al. |
| 2006/0037244 A1 | 2/2006 | Clawson |
| 2006/0107789 A1 | 5/2006 | Deegan et al. |
| 2006/0226538 A1 | 10/2006 | Kawata |
| 2006/0239890 A1 | 10/2006 | Chang et al. |
| 2007/0140004 A1 | 6/2007 | Marotta et al. |
| 2007/0183959 A1 | 8/2007 | Charlier et al. |
| 2007/0270511 A1 | 11/2007 | Melnichuk et al. |
| 2008/0041829 A1 | 2/2008 | Blutke et al. |
| 2008/0121624 A1 | 5/2008 | Belashchenko et al. |
| 2008/0169183 A1 | 7/2008 | Hertel et al. |
| 2008/0182298 A1 | 7/2008 | Day |
| 2008/0226538 A1 | 9/2008 | Rumpf et al. |
| 2008/0279749 A1 | 11/2008 | Probst et al. |
| 2009/0090282 A1 | 4/2009 | Gold et al. |
| 2009/0142250 A1 | 6/2009 | Fabry et al. |
| 2009/0155157 A1 | 6/2009 | Stenger et al. |
| 2009/0208751 A1 | 8/2009 | Green et al. |
| 2009/0230098 A1 | 9/2009 | Salsich et al. |
| 2010/0249353 A1 | 9/2010 | MacIntosh et al. |
| 2011/0036014 A1 | 2/2011 | Tsangaris et al. |
| 2011/0071962 A1 | 3/2011 | Lim |
| 2011/0076608 A1 | 3/2011 | Bergemann et al. |
| 2011/0138766 A1 | 6/2011 | Elkady et al. |
| 2011/0155703 A1 | 6/2011 | Winn |
| 2011/0239542 A1 | 10/2011 | Liu et al. |
| 2012/0018402 A1 | 1/2012 | Carducci et al. |
| 2012/0025693 A1 | 2/2012 | Wang et al. |
| 2012/0201266 A1 | 8/2012 | Boulos et al. |
| 2012/0232173 A1 | 9/2012 | Juranitch et al. |
| 2012/0292794 A1 | 11/2012 | Prabhu et al. |
| 2013/0039841 A1 | 2/2013 | Nester et al. |
| 2013/0062195 A1 | 3/2013 | Samaranayake et al. |
| 2013/0062196 A1 | 3/2013 | Sin |
| 2013/0092525 A1 | 4/2013 | Li et al. |
| 2013/0194840 A1 | 8/2013 | Huselstein et al. |
| 2013/0292363 A1 | 11/2013 | Hwang et al. |
| 2013/0323614 A1 | 12/2013 | Chapman et al. |
| 2013/0340651 A1 | 12/2013 | Wampler et al. |
| 2014/0057166 A1 | 2/2014 | Yokoyama et al. |
| 2014/0131324 A1 | 5/2014 | Shipulski et al. |
| 2014/0190179 A1 | 7/2014 | Barker et al. |
| 2014/0224706 A1 | 8/2014 | Do et al. |
| 2014/0227165 A1 | 8/2014 | Hung et al. |
| 2014/0248442 A1 | 9/2014 | Luizi et al. |
| 2014/0290532 A1 | 10/2014 | Rodriguez et al. |
| 2014/0294716 A1 | 10/2014 | Susekov et al. |
| 2014/0357092 A1 | 12/2014 | Singh |
| 2014/0373752 A2 | 12/2014 | Hassinen et al. |
| 2015/0044516 A1 | 2/2015 | Kyrlidis et al. |
| 2015/0064099 A1 | 3/2015 | Nester et al. |
| 2015/0180346 A1 | 6/2015 | Yuzurihara et al. |
| 2015/0210856 A1 | 7/2015 | Johnson et al. |
| 2015/0210857 A1 | 7/2015 | Johnson et al. |
| 2015/0210858 A1 | 7/2015 | Hoermann et al. |
| 2015/0211378 A1 | 7/2015 | Johnson et al. |
| 2015/0218383 A1 | 8/2015 | Johnson et al. |
| 2015/0223314 A1 | 8/2015 | Hoermann et al. |
| 2016/0030856 A1 | 2/2016 | Kaplan et al. |
| 2016/0210856 A1 | 7/2016 | Assenbaum et al. |
| 2017/0034898 A1 | 2/2017 | Moss et al. |
| 2017/0037253 A1 | 2/2017 | Hardman et al. |
| 2017/0058128 A1 | 3/2017 | Johnson et al. |
| 2017/0066923 A1 | 3/2017 | Hardman et al. |
| 2017/0073522 A1 | 3/2017 | Hardman et al. |
| 2017/0349758 A1 | 12/2017 | Johnson |
| 2018/0015438 A1 | 1/2018 | Taylor et al. |
| 2018/0016441 A1 | 1/2018 | Taylor et al. |
| 2018/0022925 A1 | 1/2018 | Hardman et al. |

FOREIGN PATENT DOCUMENTS

| | | |
|---|---|---|
| CA | 964405 A1 | 3/1975 |
| CA | 2 353 752 A1 | 1/2003 |
| CA | 2 621 749 A1 | 8/2009 |
| CN | 1644650 A | 7/2005 |
| CN | 102108216 A | 6/2011 |
| CN | 102993788 A | 3/2013 |

(56) References Cited

FOREIGN PATENT DOCUMENTS

| | | |
|---|---|---|
| CN | 103160149 A | 6/2013 |
| CN | 203269847 U | 11/2013 |
| DE | 198 07 224 A1 | 8/1999 |
| EA | 200300389 | 12/2003 |
| EP | 0 616 600 A1 | 9/1994 |
| EP | 0 635 044 B1 | 2/1996 |
| EP | 0 635 043 B1 | 6/1996 |
| EP | 0 861 300 A1 | 9/1998 |
| EP | 1188801 A1 | 3/2002 |
| FR | 2 891 434 A1 | 3/2007 |
| FR | 2 937 029 A1 | 4/2010 |
| GB | 395893 | 7/1933 |
| GB | 987498 | 3/1965 |
| GB | 1 400 266 A | 7/1975 |
| GB | 1 492 346 A | 11/1977 |
| JP | 6-322615 A | 11/1994 |
| JP | 2004-300334 A | 10/2004 |
| JP | 2005-243410 A | 9/2005 |
| KR | 10-2008-105344 | 12/2008 |
| KR | 2014-0075261 A | 6/2014 |
| RU | 2425795 | 8/2011 |
| RU | 2488984 | 7/2013 |
| TG | 2015/116798 A1 | 8/2015 |
| WO | 93/12031 A1 | 6/1993 |
| WO | 93/18094 A1 | 9/1993 |
| WO | 93/20153 A1 | 10/1993 |
| WO | 93/23331 A1 | 11/1993 |
| WO | 1994/008747 A1 | 4/1994 |
| WO | 97/03133 A1 | 1/1997 |
| WO | 03014018 A1 | 2/2003 |
| WO | 2012/015313 A1 | 2/2012 |
| WO | 2012/067546 A2 | 5/2012 |
| WO | 2012/094743 A1 | 7/2012 |
| WO | 2012/149170 A1 | 11/2012 |
| WO | 2013/134093 A1 | 9/2013 |
| WO | 2013/184074 A1 | 12/2013 |
| WO | 2013/185219 A1 | 12/2013 |
| WO | 2014/000108 A1 | 1/2014 |
| WO | 2014/012169 A1 | 1/2014 |
| WO | 2015/049008 A1 | 4/2015 |
| WO | 2015/116797 A1 | 8/2015 |
| WO | 2015/116800 A1 | 8/2015 |
| WO | 2015/116807 A1 | 8/2015 |
| WO | 2015/116811 A1 | 8/2015 |
| WO | 2015/116943 A2 | 8/2015 |
| WO | 2016/012367 A1 | 1/2016 |
| WO | 2016/126598 A1 | 8/2016 |
| WO | 2016/126599 A1 | 8/2016 |
| WO | 2016/126600 A1 | 8/2016 |
| WO | 2016014641 A1 | 8/2016 |
| WO | 2017/019683 A1 | 2/2017 |
| WO | 2017/027385 A1 | 2/2017 |
| WO | 2017/034980 A1 | 3/2017 |
| WO | 2017/044594 A1 | 3/2017 |
| WO | 2017/048621 A1 | 3/2017 |
| WO | 2017/190015 A1 | 11/2017 |
| WO | 2017/190045 A1 | 11/2017 |

OTHER PUBLICATIONS

ISR and Written Opinion from PCT/US2015/013510, dated Apr. 22, 2015.
ISR and Written Opinion from PCT/US2016/015939, dated Jun. 3, 2016.
ISR and Written Opinion from PCT/US2016/015941, dated Apr. 21, 2016.
Isr and Written Opinion from PCT/US2016/015942, dated Apr. 11, 2016.
ISR and Written Opinion from PCT/US2016/044039, dated Oct. 6, 2016.
ISR and Written Opinion from PCT/US2016/045793, dated Oct. 18, 2016.
ISR and Written Opinion from PCT/US2016/050728, dated Nov. 18, 2016.
ISR and Written Opinion from PCT/US2016/051261, dated Nov. 18, 2016.
ISR and Written Opinion from PCT/US2015/013484, dated Apr. 22, 2015.
AP 42, Fifth Edition, vol. I, Chapter 6: Organic Chemical Process Industry, Section 6.1: Carbon Black.
Fulcheri, et al. "Plasma processing: a step towards the production of new grades of carbon black." Carbon 40.2 (2002): 169-176.
Grivei, et al. "A clean process for carbon nanoparticles and hydrogen production from plasma hydrocarbon cracking" Publishable Report, European Commission JOULE III Programme, Project No. JOE3-CT97-0057, circa 2000.
Fabry, et al. "Carbon black processing by thermal plasma. Analysis of the particle formation mechanism." Chemical Engineering Science 56.6 (2001): 2123-2132.
Pristavita, et al. "Carbon nanoparticle production by inductively coupled thermal plasmas: controlling the thermal history of particle nucleation." Plasma Chemistry and Plasma Processing 31.6 (2011): 851-866.
Cho, et al. "Conversion of natural gas to hydrogen and carbon black by plasma and application of plasma black." Symposia—American Chemical Society, Div. Fuel Chem. vol. 49. 2004.
Pristavita, et al. "Carbon blacks produced by thermal plasma: the influence of the reactor geometry on the product morphology." Plasma Chemistry and Plasma Processing 30.2 (2010): 267-279.
Pristavita, et al. "Volatile Compounds Present in Carbon Blacks Produced by Thermal Plasmas." Plasma Chemistry and Plasma Processing 31.6 (2011): 839-850.
Garberg, et al. "A transmission electron microscope and electron diffraction study of carbon nanodisks." Carbon 46.12 (2008): 1535-1543.
Knaapila, et al. "Directed assembly of carbon nanocones into wires with an epoxy coating in thin films by a combination of electric field alignment and subsequent pyrolysis." Carbon 49.10 (2011): 3171-3178.
Krishnan, et al. "Graphitic cones and the nucleation of curved carbon surfaces." Nature 388.6641 (1997): 451-454.
Høyer, et al. "Microelectromechanical strain and pressure sensors based on electric field aligned carbon cone and carbon black particles in a silicone elastomer matrix." Journal of Applied Physics 112.9 (2012): 094324.
Naess, Stine Nalum, et al. "Carbon nanocones: wall structure and morphology." Science and Technology of advanced materials (2009), 7 pages.
Fulcheri, et al. "From methane to hydrogen, carbon black and water." International journal of hydrogen energy 20.3 (1995): 197-202.
ISR and Written Opinion from PCT/US2016/047769, dated Dec. 30, 2016.
D.L. Sun, F. Wang, R.Y. Hong, C.R. Xie, Preparation of carbon black via arc discharge plasma enhanced by thermal pyrolysis, Diamond & Related Materials (2015), doi: 10.1016/j.diamond.2015.11.004, 47 pages.
Non-Final Office Action dated Feb. 22, 2017 in U.S. Appl. No. 14/591,541.
Non-Final Office Action dated May 2, 2017 in U.S. Appl. No. 14/610,299.
Ex Parte Quayke Action dated May 19, 2017 in U.S. Appl. No. 14/601,761.
Extended European Search Report from EP Application No. 15 742 910.1 dated Jul. 18, 2017.
Search report in counterpart European Application No. 15 74 3214 dated Sep. 12, 2017.
ISR and Written Opinion from PCT/US2017/030139, dated Jul. 19, 2017.
ISR and Written Opinion from PCT/US2017/030179, dated Jul. 27, 2017.
A.I. Media et al., "Tinting Strength of Carbon Black," Journal of Colloid and Interface Science, vol. 40, No. 2, Aug. 1972.
Reese, J. (2017). "Resurgence in American manufacturing will be led by the rubber and tire industry." Rubber World. 255. 18-21 and 23.

(56) References Cited

OTHER PUBLICATIONS

Non-Final Office Action dated Feb. 27, 2017 in U.S. Appl. No. 14/591,476.
Extended European Search Report from EP Application No. 15743214.7 dated Jan. 16, 2018.
Chiesa P, Lozza G, Mazzocchi L. Using Hydrogen as Gas Turbine Fuel. ASME. J. Eng. Gas Turbines Power. 2005;127(1):73-80. doi:10.1115/1.1787513.
Tsujikawa, Y., and T. Sawada. "Analysis of a gas turbine and steam turbine combined cycle with liquefied hydrogen as fuel." International Journal of Hydrogen Energy 7.6 (1982): 499-505.
Search report from RU2016135213, dated Feb. 12, 2018.
Non-Final Office Action dated Jan. 16, 2018 in U.S. Appl. No. 14/591,528.
Bakken, Jon Arne, et al. "Thermal plasma process development in Norway." Pure and applied Chemistry 70.6 (1998): 1223-1228.
Polman, E. A., J. C. De Laat, and M. Crowther. "Reduction of CO2 emissions by adding hydrogen to natural gas." IEA Green House Gas R&D programme (2003).
Verfondern, K., "Nuclear Energy for Hydrogen Production", Schriften des Forschungzentrum Julich, vol. 58, 2007.
U.S. Environmental Protection Agency, "Guide to Industrial Assessments for Pollution Prevention and Energy Efficiency," EPA 625/R-99/003, 1999.
Breeze, P. "Raising steam plant efficiency—Pushing the steam cycle boundaries." PEI Magazine 20.4 (2012).
Final Office Action dated Oct. 13, 2017 in U.S. Appl. No. 14/591,476.
Final Office Action dated Oct. 13, 2017 in U.S. Appl. No. 14/591,541.
Notice of Allowance dated Jan. 18, 2018 in U.S. Appl. No. 14/601,761.
Correced Notice of Allowance dated Feb. 9, 2018 in U.S. Appl. No. 14/601,761.
Final Office Action dated Sep. 19, 2017 in U.S. Appl. No. 15/221,088.
Non-Final Office Action dated Jan. 9, 2018 in U.S. Appl. No. 15/259.884.
Russian Official Notification of application No. 2016135213 from Russia dated Feb. 12, 2018.
Non-Final Office Action dated Mar. 16, 2016 in U.S. Appl. No. 14/591,476.
Final Office Action dated Jul. 11, 2016 in in U.S. Appl. No. 14/591,476.
Non-Final Office Action dated Mar. 16, 2016 in U.S. Appl. No. 14/591,541.
Final Office Action dated Jul. 14, 2016 in U.S. Appl. No. 14/591,541.
Non-Final Office Action dated Apr. 14, 2016 in U.S. Appl. No. 14/601,761.
Final Office Action dated Oct. 19, 2016 in U.S. Appl. No. 14/601,761.
Non-Final Office Action dated Apr. 13, 2016 in U.S. Appl. No. 14/601,793.
Final Office Action dated Aug. 3, 2016 in U.S. Appl. No. 14/601,793.
Notice of Allowance dated Oct. 7, 2016 in U.S. Appl. No. 14/601,793.
Non-Final Office Action dated Dec. 23, 2016 in U.S. Appl. No. 15/221,088.
Non-Final Office Action dated Apr. 20, 2018 in U.S. Appl. No. 15/221,088.
Extended European Search Report from EP Application No. 16747055.8 dated Jun. 27, 2018.
Extended European Search Report from EP Application No. 16747056.6 dated Jun. 27, 2018.
Invitation to Pay Additional Fees dated Jun. 18, 2018 in PCT/US2018/028619.
ISR and Written Opinion from PCT/US2018/028619, dated Aug. 9, 2018.
Non-Final Office Action dated Jun. 1, 2018 in U.S. Appl. No. 15/262,539.
Non-Final Office Action dated Jun. 7, 2018 in U.S. Appl. No. 14/591,476.
Non-Final Office Action dated Jun. 7, 2018 in U.S. Appl. No. 15/410,283.
Notice of Allowance dated Jun. 19, 2018 in U.S. Appl. No. 14/601,761.
Non-Final Office Action dated Jul. 6, 2018 in U.S. Appl. No. 15/241,771.

* cited by examiner

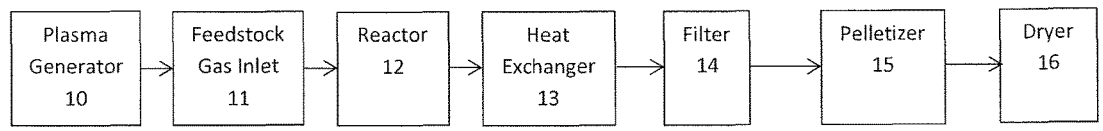

USE OF FEEDSTOCK IN CARBON BLACK PLASMA PROCESS

CROSS-REFERENCE TO RELATED APPLICATIONS

The present application claims the benefit under 35 U.S.C. § 119(e) of U.S. Provisional Application No. 61/933,488 filed Jan. 30, 2014, the disclosure of which is expressly incorporated by reference herein in its entirety.

TECHNICAL FIELD

The field of art to which this invention generally pertains is methods for making use of electrical energy to effect chemical changes.

BACKGROUND

No matter how unique the product or process is, over time, all manufacturing processes look for ways to become more efficient and more effective. This can take the form of raw material costs, energy costs, or simple improvements in process efficiencies, among other things. In general, raw material costs and energy resources, which are a substantial part of the cost of most if not all manufacturing processes, tend to actually increase over time, because of scale up and increased volumes if for no other reasons. For these, and other reasons, there is a constant search in this area for ways to not only improve the processes and products being produced, but to produce them in more efficient and effective ways as well.

The systems described herein meet the challenges described above while accomplishing additional advances as well.

BRIEF SUMMARY

A method of making carbon black is described including cracking feedstock with plasma in an apparatus having a series of unit operations with individual capacities, wherein the individual capacities of the unit operations are substantially balanced by replacing at least part of the feedstock with a feedstock having a molecular weight heavier than methane, resulting in increased utilization of the individual capacities of the unit operations and increased overall throughput.

Additional embodiments include: the method described above the heavier feedstock is at least one gas; the method described above where the heavier feedstock contains a carbon content higher than methane; the method described above where up to 100% of the feedstock is replaced with the heavier feedstock; the method described above where the unit operations include at least one reactor unit, and/or at least one heat exchanger unit, and/or at least one filter unit; the method described above where the unit operations include at least one dryer unit; the method described above where the unit operations include at least one pelletizer unit; the method described above where the heavier feedstock is one or more of ethane, propane, butane, acetylene, ethylene, butane, carbon black oil, coal tar, crude coal tar, diesel oil, benzene, and methyl naphthalene; the method described above where the heavier feedstock contains one or more additional polycyclic aromatic hydrocarbons.

These and additional embodiments, will be apparent from the following descriptions.

BRIEF DESCRIPTION OF THE DRAWINGS

The FIGURE shows a schematic representation of one typical system as described herein.

DETAILED DESCRIPTION

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice.

The present invention will now be described by reference to more detailed embodiments. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are expressly incorporated by reference in their entirety.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Every numerical range given throughout this specification will include every narrower numerical range that falls within such broader numerical range, as if such narrower numerical ranges were all expressly written herein.

Additional advantages of the invention will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

As described herein, the use of ethane or heavier feedstock gases to reduce costs and balance reactor capacity in a plasma reactor is described. Ethane and/or other heavier than methane hydrocarbons can be used in place of part or all of the methane as the process' feedstock. The use of feedstock heavier than methane in the plasma process reduces the required energy per unit of production. Use of heavier feedstocks can therefore result in lower raw material costs and higher energy efficiencies. However, by replacing a portion or all of the methane/natural gas as feedstock with the heavier feedstock, if done properly this also can allow for better (or ideally full) utilization of the front and back end individual unit capacities and so reduce overall costs or increase profitability, even when the heavier feedstock costs more than the lighter feedstock, by spreading fixed costs over a higher amount of product produced per unit of time, or simply by generating additional product to sell. Use of heavier feedstocks may also improve product quality (lower grit and/or extract from forming product faster, higher structure/CDBP (crushed dibutyl phthlate number) or DBP (dibutyl phthlate number), higher surface area).

The use of ethane to substitute a portion of the methane in a way to increase, e.g., conventional reactor and/or heat exchanger and/or filter capacity so that it matches the available downstream capacity, e.g., conventional heat exchanger/product cooler, filter, pelletisation and/or dryer capacity (often the dryer being the limit to production) can be extremely advantageous. For example, this balancing of capacity can result in higher profitability from increased sales on reactor or heat exchanger or filter limited grades even when the raw material cost, or even the total cost, of the product increases due to the potentially higher cost of ethane or heavier feedstocks. As described herein, the use of the heavier feedstock enriches the feedstock used and so increases the utilization of the back end of the plasma unit, which can result in enabling higher sales and profitability, or just to satisfy customer demands for additional more expensive to make product.

While heavier does refer to relative molecular weights, i.e., grams per mole (gm/mol), it is the carbon content of the feedstock (% carbon by weight) that best represents the potential for improvement, with the increasing presence of unsaturated bonds within the feedstock that can also have a positive effect on the process, for example, the use of ethylene in place of or in addition to ethane. It should also be noted that while the gas form of the feedstock is typically used, while it can be more expensive, liquid forms of the feedstocks described herein can also be employed.

If the hydrocarbon feedstock is represented by the chemical formula $C_nH_{(2n+2)}$, the results described herein can improve with increase in "n". However, with unsaturated and/or cyclical compounds, the +2 actually changes to a smaller or negative number, for example, carbon black feedstock in a furnace process is typically $C_nH_n$, and coal tar actually $C_nH_{n/2}$.

The use of the heavier feedstocks as described herein results in the ability to balance or match the capacities of each unit of operation. Production from the full set of equipment is restricted to the lowest individual unit capacity step, with those capacity limits often determined by such things as the grade of production and the feedstock used. Often reactor limits match filter limits, but heat exchanger limits can represent a different limit for the process. For example, furnace processes typically couples the reactor and heat exchanger limits. There is also typically a given evaporation rate in the dyer. Changing the dryer is expensive, and so it typically represents the limit of the unit, but not always. Thus using the full dryer capacity all the time by using heavier feedstocks when the reactor, heat exchanger, filter or other unit operation that benefits from heavier feedstocks is unable to provide enough product when using methane or light feedstocks to use all of the dryer capacity can increase a production train's profitability.

The amount of methane replaced can be meaningful at any level, e.g., even as little as 1% by weight or volume, 2%, 3%, etc. up to 100%. And once 100% of the methane is replaced with ethane, for example, additional capacity benefits can be achieved by replacing the ethane with a heavier feedstock such as propane, for example, and so forth, on up to heavier and higher molecular weight gases and liquids.

While relative cost is of course a consideration which needs to be factored into the selection, in addition to ethane, any additional gases or liquids which are operable in conventional carbon black producing processes may be selected, including, for example, propane, butane, acetylene, ethylene, butane, carbon black oil, coal tar, crude coal tar, diesel oil, benzene, methyl naphthalene, etc.

EXAMPLE 1

While useful with any conventional unit operation containing carbon black generating systems typically used to generate carbon black products, one system is shown schematically in the FIGURE, including a plasma generator (10) generates plasma to which the feedstock gas (11) (typically methane) is added. The mixed gases enter into a reactor (12) where the carbon black is generated followed by a heat exchanger (13). The carbon black is then filtered (14), pelletized in a pelletizer (15) and dried in a dryer (16). By replacing the methane gas with ethane gas, as stated above, the heavier feedstock enriches the feedstock used and increases the production rate of a reactor, heat exchanger and/or filter limited grade so that it more fully utilizes the capacity of downstream equipment, potentially enabling higher sales and profitability. Other conventional unit operations may exist, for example, between the filter and pelletizer units shown, or elsewhere as desired or appropriate. They may include hydrogen/tail gas removal units, conveying units, process filter units, classification units, grit reduction mill units, purge filter units (filters black out of steam vented from dryer, for example), dust filter units (collects dust from other equipment, for example), off quality product blending units, etc., as may be typically found in carbon black production systems. And of course, these unit operations could and be subjected to the balancing and enhanced utilization as described herein as well. As further demonstrated in the Table 1 below, for the same power (kilowatts=kW), a carbon black production unit would typically make the same amount of N326 as N330 grade carbon black (CB). However, N330 has a higher OAN (oil absorption number) and so needs more water per kilogram produced to pelletize, which would also dictate the need for a larger dryer. If a unit had such a larger dryer, then using ethane to make N326 would increase the production rate to 168 kilograms(kg)/hour(hr) and still leave some dryer capacity unutilized. Similarly, for the filter, using ethane reduces the required filter size. The replacement of methane with ethane could reduce the required filter area, e.g., should some of the filter capacity get damaged, or a difficult-to-filter grade be manufactured on the same unit.

TABLE 1*

| Feedstock | | Methane | Methane | Ethane | Ethane |
|---|---|---|---|---|---|
| Grade | | N326 | N330 | N326 | N330 |
| OAN | | 72 | 102 | 72 | 102 |
| Torch Power | kW | 750 | 750 | 750 | 750 |
| Reactor Temp | °C. | 1400 | 1400 | 1400 | 1400 |
| CB Production | kg/hr | 128 | 128 | 168 | 168 |
| Filtration Rate | Nm$^3$/hr | 1353 | 1353 | 1423 | 1423 |
| Sp. Filter Rate | Nm$^3$/kg | 11 | 11 | 8 | 8 |
| Dryer Evap. | kgH$_2$O/hr | 101 | 143 | 133 | 189 |

*C = centigrade; Temp = temperature; Sp. = specific; Evap. = evaporation; Nm$^3$ = normal meter, i.e., cubic meter of gas at normal conditions, i.e. 0° C., and 1 atmosphere of pressure.

EXAMPLE 2

A unit fully utilized making N330 also needs to make N234. This grade requires more energy per kilo of black, but does not have a sufficiently large power supply. By adding ethane the unit can make more N234, and so satisfy customer demands that the equipment could not when using Methane.

TABLE 2

| Feedstock | | Methane | Methane | Ethane | Ethane |
|---|---|---|---|---|---|
| Grade | | N234 | N330 | N234 | N330 |
| OAN | | 125 | 102 | 125 | 102 |
| Torch Power | kW | 750 | 750 | 750 | 750 |
| Reactor Temp | °C. | 1925 | 1400 | 1925 | 1400 |
| CB Production | kg/hr | 85 | 128 | 110 | 168 |
| Filtration Rate | Nm$^3$/hr | 1513 | 1353 | 1552 | 1423 |
| Sp. Filter Rate | Nm$^3$/kg | 19 | 11 | 14.5 | 8 |
| Dryer Evap. | kgH$_2$O/hr | 117 | 143 | 151 | 189 |

Thus, the scope of the invention shall include all modifications and variations that may fall within the scope of the attached claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of making carbon black, comprising:
cracking a first feedstock with plasma; and
increasing overall throughput of a given grade of the carbon black by replacing at least part of the first feedstock with a second feedstock and cracking the second feedstock with the plasma, wherein increasing the overall throughput further comprises cracking a mixture of the first feedstock, and the second feedstock with the plasma.

2. The method of claim 1, wherein the second feedstock is heavier than the first feedstock.

3. The method of claim 1, further comprising cracking the first feedstock and the second feedstock in an apparatus comprising at least one reactor unit, at least one heat exchanger unit, at least one filter unit, at least one hydrogen gas removal unit, at least one pelletizer unit and at least one dryer unit.

4. The method of claim 1, wherein at least one of the first feedstock and the second feedstock is a gas.

5. The method of claim 4, wherein each of the first feedstock and the second feedstock is a gas.

6. The method of claim 1, wherein the second feedstock comprises one or more aromatic hydrocarbons.

7. The method of claim 6, wherein the second feedstock comprises one or more polycyclic aromatic hydrocarbons.

8. The method of claim 1, wherein the second feedstock comprises one or more of ethane, propane, butane, acetylene, ethylene, butane, carbon black oil, coal tar, crude coal tar, diesel oil, benzene and methyl naphthalene.

9. The method of claim 1, wherein the second feedstock is heavier relative to methane.

10. The method of claim 1, wherein the second feedstock has a greater carbon content than the first feedstock.

11. The method of claim 10, wherein the second feedstock has a % carbon by weight greater than the first feedstock.

12. A method of making carbon black, comprising:
cracking a first feedstock with plasma; and
increasing overall throughput of a given grade of the carbon black by replacing, at least part of the first feedstock with a second feedstock and cracking the second feedstock with the plasma, further comprising replacing at least part of the first feedstock with the second feedstock during cracking of the first feedstock.

13. The method of claim 12, wherein the second feedstock comprises one or more of ethane, propane, butane, acetylene, ethylene, butane, carbon black oil, coal tar, crude coal tar, diesel oil, benzene and methyl naphthalene.

14. The method of claim 12, wherein the second feedstock comprises one or more aromatic hydrocarbons.

15. The method of claim 14, wherein the second feedstock comprises one or more polycyclic aromatic hydrocarbons.

16. The method of claim 12, wherein the second feedstock is heavier than the first feedstock.

17. The method of claim 12, further comprising cracking the first feedstock and the second feedstock in an apparatus comprising at least one reactor unit, at least one heat exchanger unit, at least one filter unit, at least one hydrogen gas removal unit, at least one pelletizer unit and at least one dryer unit.

18. The method of claim 12, wherein at least one of the first feedstock and the second feedstock is a gas.

19. The method of claim 18, wherein each of the first feedstock and the second feedstock is a gas.

20. The method of claim 12, wherein the second feedstock is heavier relative to methane.

21. The method of claim 12, wherein the second feedstock has a greater carbon content than the first feedstock.

22. The method of claim 21, wherein the second feedstock has a % carbon by weight greater than the first feedstock.

23. A method of making carbon black, comprising:
cracking a first feedstock with plasma; and
increasing overall throughput of a given grade of the carbon black by replacing at least part of the first feedstock with a second feedstock and cracking the second feedstock with the plasma, wherein at least one of the first feedstock and the second feedstock comprises a feedstock mixture.

24. The method of claim 23, wherein each of the first feedstock and the second feedstock comprises a feedstock mixture.

25. The method of claim 23, wherein the second feedstock comprises one or more of ethane, propane, butane, acetylene, ethylene, butane, carbon black oil, coal tar, crude coal tar, diesel oil, benzene and methyl naphthalene.

26. The method of claim 23, wherein the second feedstock comprises one or more aromatic hydrocarbons.

27. The method of claim 26, wherein the second feedstock comprises one or more polycyclic aromatic hydrocarbons.

28. The method of claim 23, wherein the second feedstock is heavier than the first feedstock.

29. The method of claim 23, further comprising cracking the first feedstock and/or the second feedstock in an apparatus comprising at least one reactor unit, at least one heat exchanger unit, at least one filter unit, at least one hydrogen gas removal unit, at least one pelletizer unit and at least one dryer unit.

30. The method of claim 23, wherein at least one of the first feedstock and the second feedstock is a gas.

31. The method of claim 30, wherein each of the first feedstock and the second feedstock is a gas.

32. The method of claim 23, wherein the second feedstock is heavier relative to methane.

33. The method of claim. 23, wherein the second feedstock has a greater carbon content than the first feedstock.

34. The method of claim 33, wherein the second feedstock has a % carbon by weight greater than the first feedstock.

\* \* \* \* \*